United States Patent

Yahagi et al.

[11] Patent Number: 6,124,983
[45] Date of Patent: Sep. 26, 2000

[54] ZOOM LENS

[75] Inventors: Satoshi Yahagi, Kitaadachi-gun; Tetsuya Ori, Kawaguchi, both of Japan

[73] Assignee: Fuji Photo Optical Co., Ltd., Omiya, Japan

[21] Appl. No.: 09/377,903

[22] Filed: Aug. 20, 1999

[30] Foreign Application Priority Data

Sep. 4, 1998 [JP] Japan .................. 10-5810230

[51] Int. Cl.$^7$ .................................. G02B 15/14
[52] U.S. Cl. ........................................ 359/687
[58] Field of Search ................. 359/683, 687, 359/676

[56] References Cited

FOREIGN PATENT DOCUMENTS 7-199071  8/1995  Japan .
2740890  1/1998  Japan .

Primary Examiner—Scott J. Sugarman
Attorney, Agent, or Firm—Arnold International; Bruce Y. Arnold

[57] ABSTRACT

A compact zoom lens having only four lens groups is provided which changes power by shifting a second lens group from the object side along the optical axis, and stabilizes the image plane position by shifting a fourth lens group from the object side along the optical axis. By satisfying three prescribed conditions, magnification of the image is prevented from decreasing for objects at very near distances, and aberrations are favorably corrected so as to provide for high quality imaging over the entire range of zoom for all object distances. At least one lens element has an aspherical surface.

4 Claims, 9 Drawing Sheets

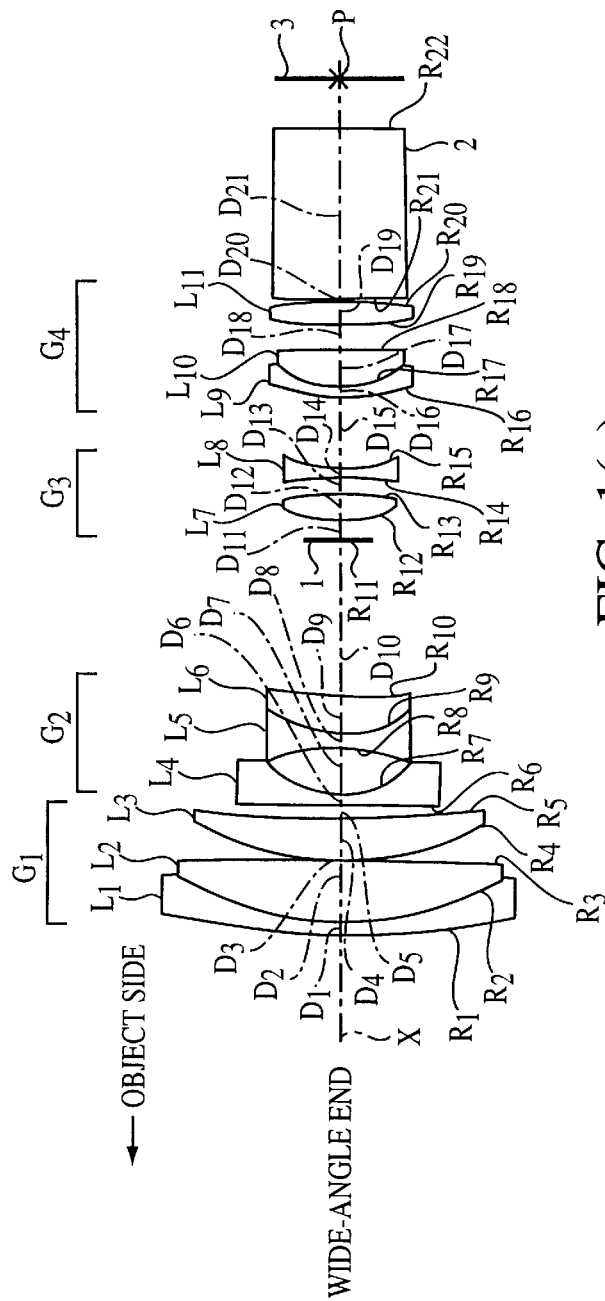
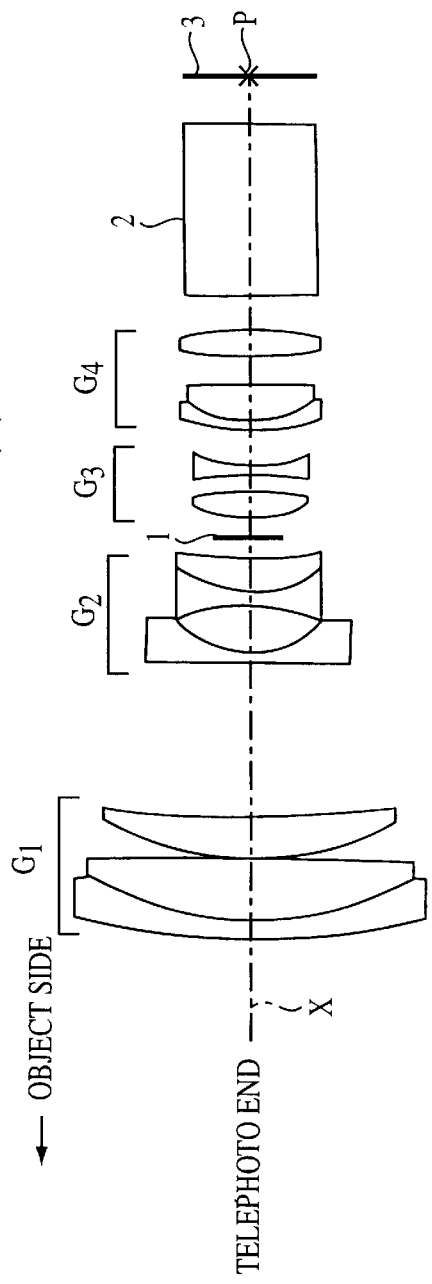
FIG. 1(a)
FIG. 1(b)

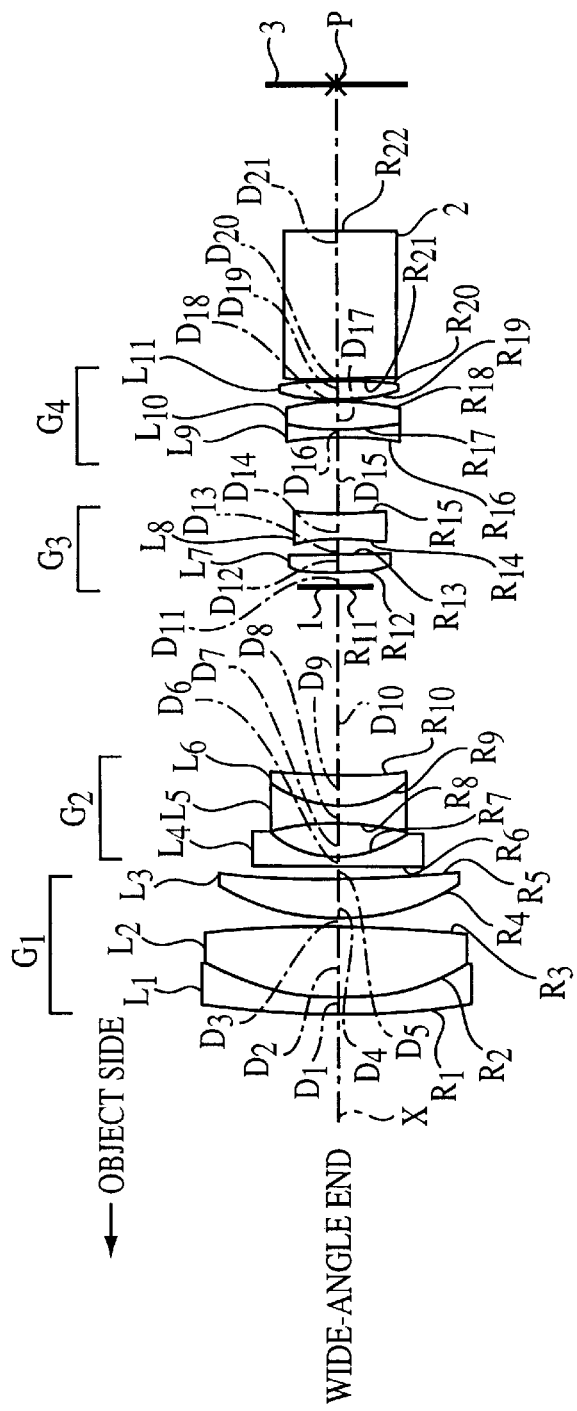
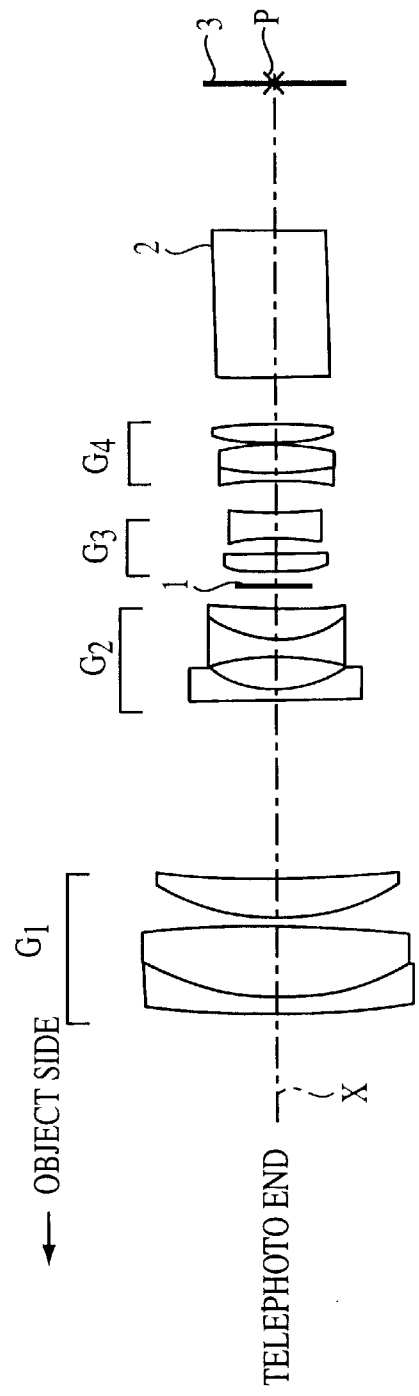
FIG. 3(a)
FIG. 3(b)

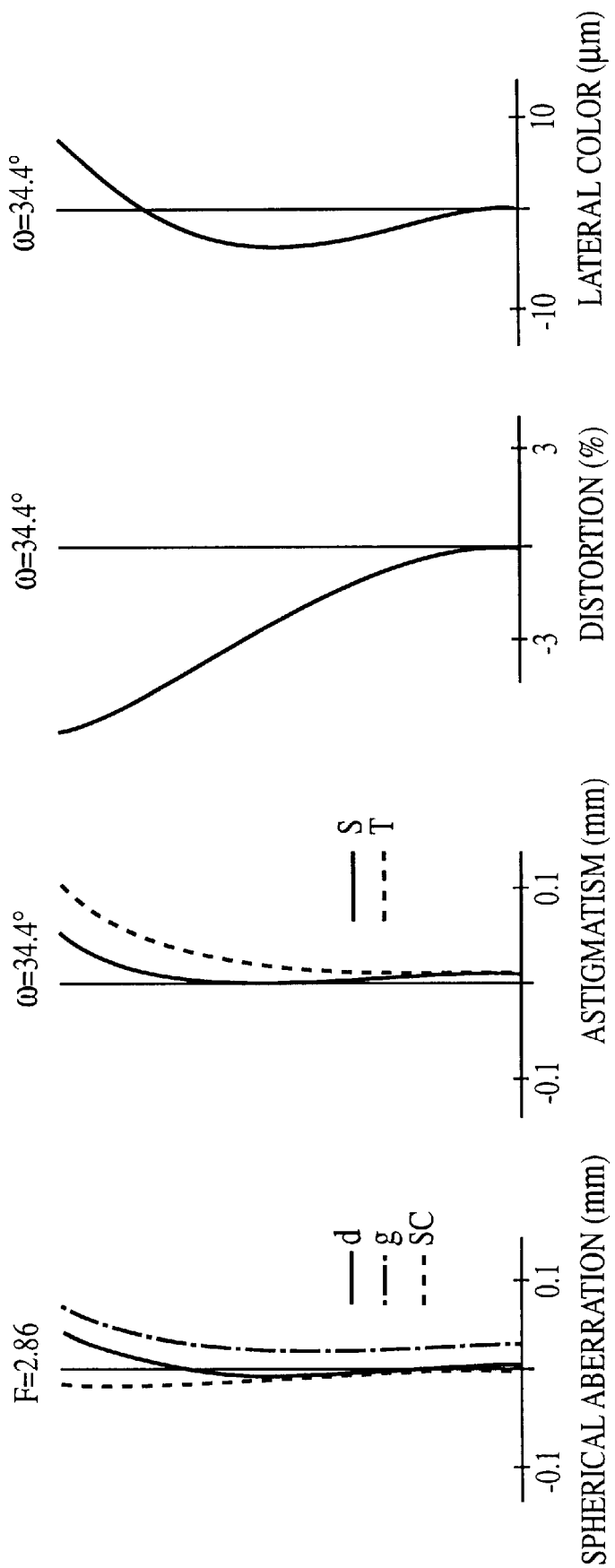

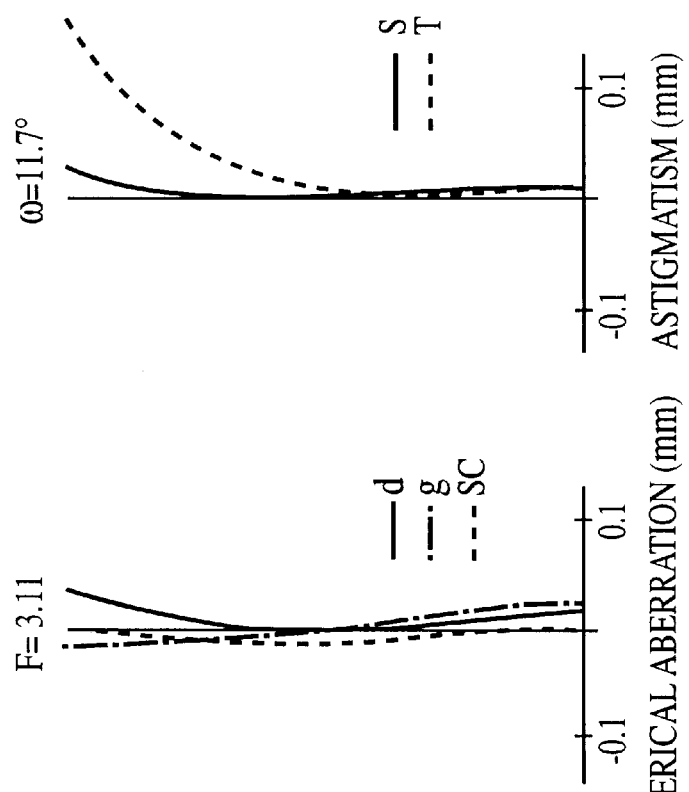

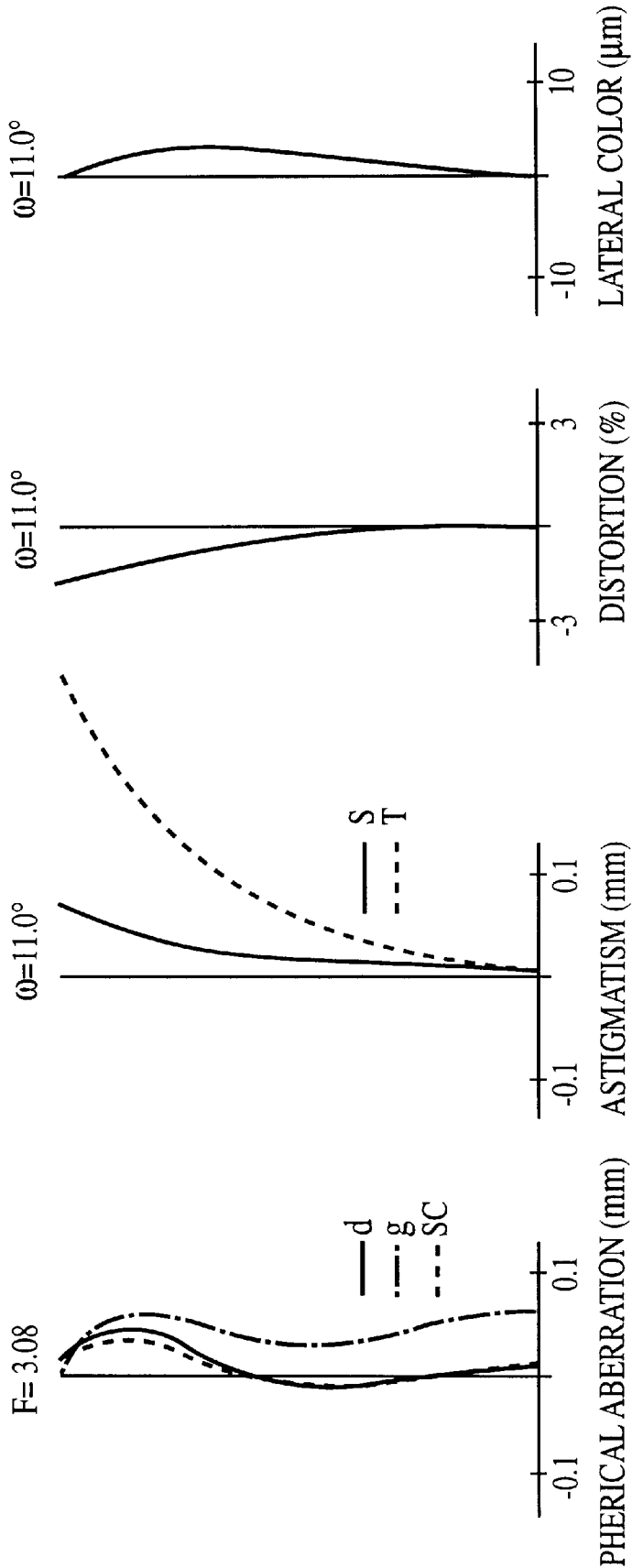

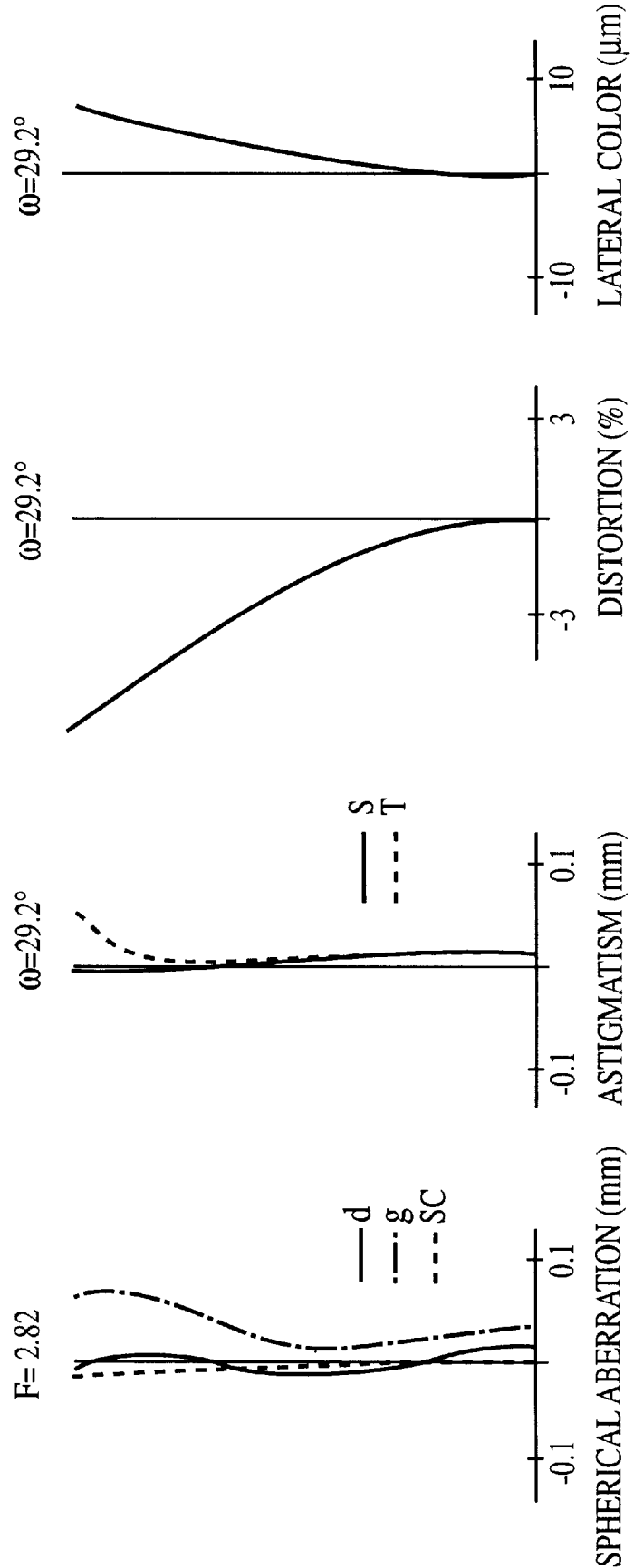

ZOOM LENS

BACKGROUND OF THE INVENTION

As there has been a trend in marketing video cameras to shift from an image size of about ⅓ inch in height to a smaller image of about ¼ inch in height, there has also been a demand for simplification of the zoom lens for such video cameras. A zoom lens of the rear-focus type is known for use in video cameras wherein the lens consists of four lens groups and power is varied by shifting the second lens group from the object side along the optical axis so as to vary the focal length of the lens. The first lens group and third lens group from the object side remain at a fixed location. A fourth lens group from the object side is shifted so as to maintain the image surface fixed during zooming and focusing on objects at different object distances. Examples of such a rear-focus zoom lens are disclosed in, for instance, Japanese Patent Bulletin No. 2740890 and Japanese Laid-open Patent Application No. H7-199071.

In the zoom lens disclosed in the above-noted Patent Bulletin, predetermined conditions are satisfied regarding: 1) the image magnification ratio between the telephoto end and the wide-angle end when the lens is focused at infinity, 2) the focal length ratio between the telephoto end and the wide-angle end, and 3) the lateral magnifications of the third lens group and the fourth lens group at the telephoto end and the wide-angle end when the lens is focused on a nearby object. The lens has a simple configuration and the fluctuation of variable power is small when the object distance is varied.

The zoom lens disclosed in the above-noted Japanese Laid-open Patent Application has a configuration so as to obtain: 1) predetermined values of refractive power of the second lens group and the fourth lens group, 2) a predetermined refractive power ratio between the second lens group and the fourth lens group, 3) a predetermined refractive power ratio between the first lens group and the third lens group, and 4) a predetermined refractive power of the third lens group so that the lens is compact and aberrations are favorably corrected.

Moreover, in a rear-focus zoom lens consisting of four lens groups as described above, image locations of the first lens group differ depending on the object distance, and the second lens group is essentially immobile in the case where the object is at a maximum near distance or at a maximum telephoto distance. Thus, there is a problem in that the magnification of the lens varies depending on object distance. In particular, the magnification decreases at very near object distances.

In order to prevent such a decrease in magnification, the fourth lens group position can be made to compensate by varying its range of movement, but as a result the overall length of the lens will increase. In other words, as a zoom lens with a larger mobility of the fourth lens group is installed in a camera, the camera will become larger and thus less compact.

On the other hand, when a lens is made compact by increasing the refractive power of each lens group and by reducing the mobility of the fourth lens group, refractive power of the lens concentrates. As a result, the fluctuation in lens properties becomes larger. Thus, it will become difficult to provide high picture quality for all object distances over the entire range of zoom.

In the above-noted rear-focus zoom lens described in Patent Bulletin No. 2740890, the third lens group consists of as many as four or five lens elements. Thus, such a design does not fully accomplish the objective of making the lens compact while providing a high picture quality.

BRIEF SUMMARY OF THE INVENTION

The present invention relates to a rear-focus zoom lens for use in home video cameras and electronic still cameras and, more particularly, relates to a compact zoom lens having a variable power ratio of about 3. The objects of the invention are to provide a compact zoom lens which can prevent the magnification from decreasing even when an object is at a very near distance and, at the same time, to provide high picture quality for all object distances over an entire range of zoom.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 1(a) and 1(b) show the basic lens element structure of Embodiment 1,

FIGS. 3(a) and 3(b) show the basic lens element structure of Embodiment 3 at the wide-angle end and telephoto end, respectively, FIGS. 4(a)–4(d) show the spherical aberration, astigmatism, distortion, and lateral color respectively, at the wide-angle end of the lens of Embodiment 1.

FIGS. 5(a)–5(d) show the spherical aberration, astigmatism, distortion, and lateral color at the telephoto end of the lens of Embodiment 1.

FIGS. 7(a)–7(d) show the spherical aberration, astigmatism, distortion, and lateral color at the telephoto end of the lens of Embodiment 2.

FIGS. 8(a)–8(d) show the spherical aberration, astigmatism, distortion, and lateral color respectively, at the wide-angle end of the lens of Embodiment 3.

DETAILED DESCRIPTION

Figure 2A:
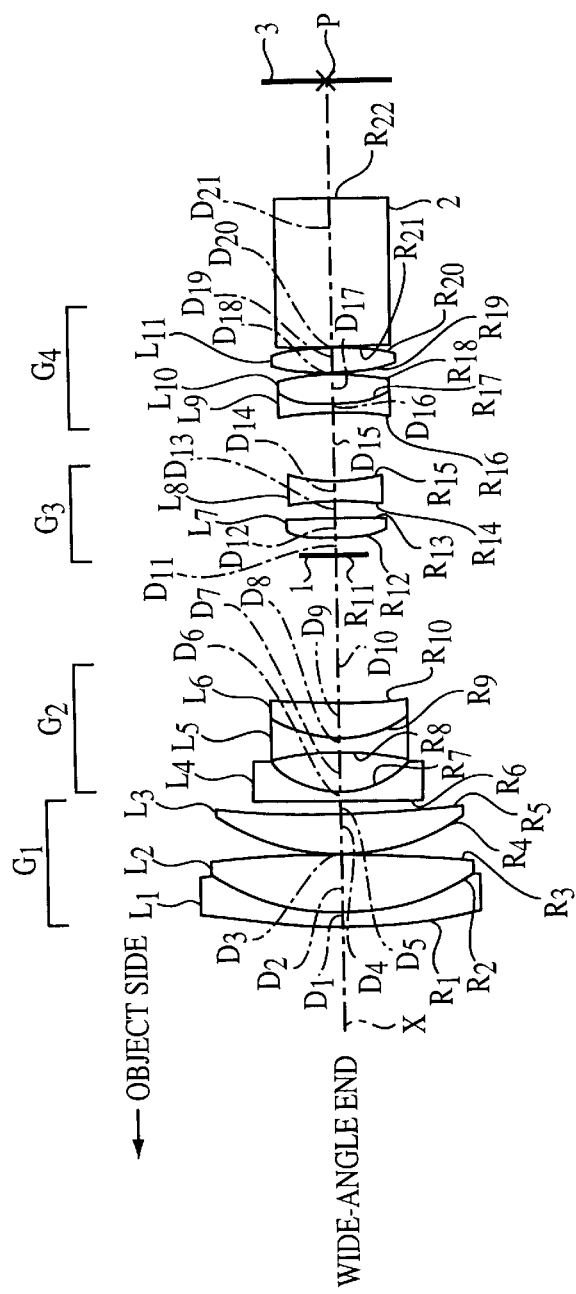
FIGS. 2(a) and 2(b) show the basic lens element structure of Embodiment 2 at the wide-angle end and telephoto end, respectively.

The present invention is an improved design for a zoom lens having four lens groups, of positive, negative, positive, and positive refractive power, in order from the object side. Zooming is accomplished by moving the second lens group along the optical axis, while the first lens group and the third lens group remain stationary. Variations in image location due to zooming and/or due to a change in distance of a viewed object are compensated-for by shifting the fourth lens group along the optical axis so as to keep the image surface stationary. At least one lens surface is aspherical. The improved design of the present invention is to ensure that the following conditions are satisfied:

$0.55 < |f_2|/(f_w \times f_t)^{0.5} < 0.70$   Condition (1)

$1.65 < f_3/(f_w \times f_t)^{0.5} < 2.10$   Condition (2)

$1.00 < f_4/(f_w \times f_t)^{0.5} < 1.20$  Condition (3)

where $f_2$ is the focal length of the second lens group,
$f_3$ is the focal length of the third lens group,
$f_4$ is the focal length of the fourth lens group,
$f_w$ is the focal length of the zoom lens at the wide-angle end, and
$f_t$ is the focal length of the zoom lens at the telephoto end.

It is preferable that the third lens group consists of two lens elements, one with positive refractive power and one with negative refractive power, and that at least one surface of the lens element with positive refractive power be aspherical.

It is also preferable that the fourth lens group consists of, in order from the object side, a lens element of negative refractive power cemented to a lens element of positive refractive power, and a lens element of positive refractive power. It is also preferred if at least one surface of the last-mentioned lens element with positive refractive power be aspherical.

In the zoom lens relating to the present invention, conventional problems are solved by the above-mentioned configuration. The lens is constructed so that the refractive power of the second lens group satisfies Condition (1), the refractive power of the third lens group satisfies Condition (2), and the refractive power of the fourth lens group satisfies Condition (3). Thus, a rear focus zoom lens is provided that is compact and wherein the zoom ratio is nearly independent of object distances.

The above-noted conditions will now be explained.

Condition (1) regulates the refractive power of the second lens group. When the value of $|f_2|/(f_w \times f_t)^{0.5}$ drops below the lower limit, refractive power becomes so strong that there will be no zoom mobility and there also will be little change in zoom ratios due to object distances; however, the fluctuation of properties due to zooming will become large and it will be difficult to make the lens compact. On the other hand, when the value of $|f_2|/(f_w \times f_t)^{0.5}$ exceeds the upper limit, the fluctuation of properties due to zooming will be small but zoom mobility will be large, so that the change in zoom ratios due to object distances will be large and it will be difficult to make the lens compact.

Condition (2) regulates the refractive power of the third lens group. Even though the third lens group is fixed, the location of the image changes due to movement of the second lens group and due to changes in object distance. If this change in image location is large, the change in zoom ratios also becomes large. However, if the refractive power of the third lens group is made large, image magnification by the third lens group increases with an increase in object distance. Thus, a decrease in zoom ratios can be restrained.

In Condition (2), when the value of $f_3/(f_w \times f_t)^{0.5}$ exceeds the upper limit, the refractive power becomes small and the change in zoom ratios due to different object distances cannot be restrained. On the other hand, when the value of $f_3/(f_w \times f_t)^{0.5}$ drops below the lower limit, the change in zoom ratios can be restrained, but the correction of spherical aberration will be difficult.

Condition (3) regulates the refractive power of the fourth lens group. As the value of $f_4/(f_w \times f_t)^{0.5}$ drops below the lower limit, the refractive power becomes too strong and there will be less zoom mobility, thus the lens can be made compact. However, a fluctuation of properties by zooming will become large and it will be difficult to obtain high image quality over the entire zoom range. On the other hand, as the value of $f_4/(f_w \times f_t)^{0.5}$ exceeds the upper limit, the refractive power becomes too weak and zoom mobility will become large. This will prevent the lens from being made compact.

Furthermore, the lens can be made compact and light in weight by reducing the number of lens elements. On the other hand, however, it will be difficult to correct aberrations. Thus, in the present invention, by providing at least one lens element with an aspherical surface, and preferably by providing a lens element in each of the third lens group and the fourth lens group with an aspherical surface, aberrations may be favorably corrected over the entire zoom range. Further, the lens is also made compact.

Several embodiments of the invention will now be described in detail with reference to the figures.

Embodiment 1

FIGS. 1(a) and 1(d) show the basic lens element construction and lens group positions at the wide-angle end and respectively, the telephoto end according to Embodiment 1 of the present invention.

As shown in FIG. 1, the zoom lens of Embodiment 1 consists of from the object side, a first lens group $G_1$ of positive refractive power, a second lens group $G_2$ of negative refractive power, a third lens group $G_3$ of positive refractive power and a fourth lens group $G_4$ of positive refractive power. Zooming is accomplished by shifting the second lens group along the optical axis, while maintaining the first lens group and the third lens group stationary. Variations in image location due to a change of focal length (i.e., zooming) and/or a change in distance of a viewed object are compensated for by shifting the fourth lens group along the optical axis X. Also, the zoom lens satisfies the above Conditions (1)–(3).

More specifically, the first lens group has, in order from the object side, a first lens element $L_1$ of negative meniscus shape, a second lens element $L_2$ that is biconvex, and a third lens element $L_3$ of positive meniscus shape, and the first lens element $L_1$ and the second lens element $L_2$ form a cemented lens.

The second lens group has, in order from the object side of the lens, a fourth lens element $L_4$ of a negative meniscus shape, a fifth lens element $L_5$ that is biconcave, and a sixth lens element $L_6$ of positive meniscus shape. The fifth lens element $L_5$ and the sixth lens element $L_6$ are cemented together.

The third lens group has, in order from the object side of the lens, a seventh lens element $L_7$ that is biconvex, and an eighth lens element $L_8$ that is biconcave. Further, the seventh lens element $L_7$ has an aspherical surface on its object side.

The fourth lens group has, in order from the object side of the lens, a ninth lens element $L_9$ of negative meniscus shape, a tenth lens element $L_{10}$ that is biconvex, and an eleventh lens element $L_{11}$ that is biconvex. The ninth lens element $L_9$ and the tenth lens element $L_{10}$ form a cemented lens and the eleventh lens element $L_{11}$ has an aspherical surface on its object side.

Moreover, a diaphragm 1 is arranged between the second lens group and the third lens group; and a prism 2 is arranged at the image side of the fourth lens group. The luminous flux entering from the object side along the optical axis X is formed by the lens into an image. At image surface 3, which intersects the optical axis at P, a solid-state detector, or the like, may be provided. Further a prism 2 may be provided to divert a portion of the light to a finder, or the like.

Table 1 shows the surface number #, in order from the object side, the radius of curvature R (in mm) of each lens element surface, the spacing D (in mm) between each lens element surface, as well as the refractive index $N_d$ and the Abbe constant $V_d$ (at the sodium d-line) of each lens element of Embodiment 1.

Those surfaces listed in Table 1 as being aspherical have a shape expressed by Equation (A) below.

$$Z = CY^2/\{1+(1-KC^2Y^2)^{1/2}\} + A_4Y^4 + A_6Y^6 + A_8Y^8 + A_{10}Y^{10} \quad \text{(Equation A)}$$

where

Z is the length (in mm) of a line drawn from a point on the aspherical surface at distance Y from the optical axis to the tangential plane of the aspherical surface vertex, C(=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

In the middle portion of Table 1 are listed the values of $D_5$, $D_{10}$, $D_{15}$, $D_{20}$ at the wide-angle end and telephoto end. Furthermore, in the bottom portion of Table 1 are listed the focal length f and the $F_{NO.}$ of the zoom lens of this embodiment.

TABLE 1

| # | R | D | $N_d$ | $V_d$ |
|---|---|---|---|---|
| 1 | 68.445 | 1.50 | 1.84665 | 23.8 |
| 2 | 28.354 | 5.08 | 1.71299 | 53.8 |
| 3 | −1096.830 | 0.10 | | |
| 4 | 26.856 | 3.35 | 1.81600 | 46.6 |
| 5 | 81.531 | $D_5$ | | |
| 6 | 267.108 | 1.00 | 1.83400 | 37.1 |
| 7 | 8.388 | 3.64 | | |
| 8 | −21.711 | 1.00 | 1.51680 | 64.2 |
| 9 | 9.626 | 3.03 | 1.84665 | 23.8 |
| 10 | 39.060 | $D_{10}$ | | |
| 11 | diaphragm | 1.68 | | |
| 12 | aspherical | 2.30 | 1.80610 | 40.7 |
| 13 | −43.694 | 1.20 | | |
| 14 | −105.268 | 0.70 | 1.76182 | 26.5 |
| 15 | 11.860 | $D_{15}$ | | |
| 16 | 19.767 | 0.70 | 1.84665 | 23.8 |
| 17 | 10.096 | 2.96 | 1.64000 | 60.1 |
| 18 | −154.464 | 1.89 | | |
| 19 | aspherical | 2.12 | 1.59380 | 61.4 |
| 20 | −31.241 | $D_{20}$ | | |
| 21 | ∞ | 13.90 | 1.51680 | 64.2 |
| 22 | ∞ | | | |

| | WIDE | TELE |
|---|---|---|
| $D_5$ | 1.00 | 12.09 |
| $D_{10}$ | 13.13 | 2.04 |
| $D_{15}$ | 5.65 | 2.69 |
| $D_{20}$ | 0.00 | 2.96 |
| | f = 8.92 − 26.74 | $F_{NO.}$ = 2.86 − 3.07 |

Table 2 below lists the values of C, K, and $A_4$–$A_{10}$ in Equation A which define the shape of the aspherical surfaces indicated in Table 1. In the bottom section of Table 2, are listed the values of Conditions (1)–(3), respectively.

TABLE 2

| # | C | K | $A_4$ | $A_6$ | $A_8$ | $A_{10}$ |
|---|---|---|---|---|---|---|
| 12 | 0.0931 | 0.9387678 | −0.9435711 × 10$^{-4}$ | −0.1349650 × 10$^{-5}$ | 0.2332748 × 10$^{-7}$ | −0.2481641 × 10$^{-9}$ |
| 19 | 0.0358 | 0.7430991 | −0.8012595 × 10$^{-4}$ | 0.2873836 × 10$^{-6}$ | −0.1251052 × 10$^{-7}$ | 0.1402755 × 10$^{-9}$ |

Condition (1) value: $|f_2|/(f_w \times f_t)^{0.5} = 0.57$
Condition (2) value: $f_3/(f_w \times f_t)^{0.5} = 1.74$
Condition (3) value: $f_4/(f_w \times f_t)^{0.5} = 1.05$ Embodiment 2

Figure 2B:
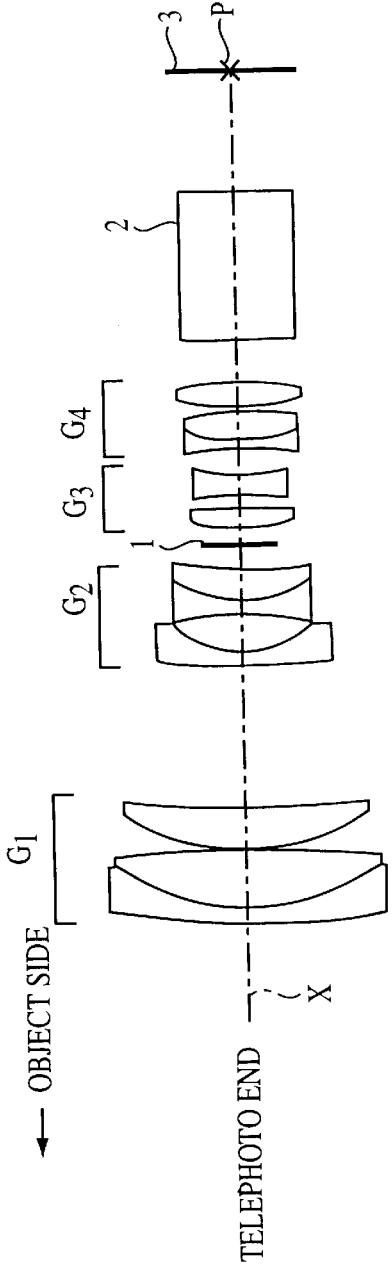
Figure 6D:
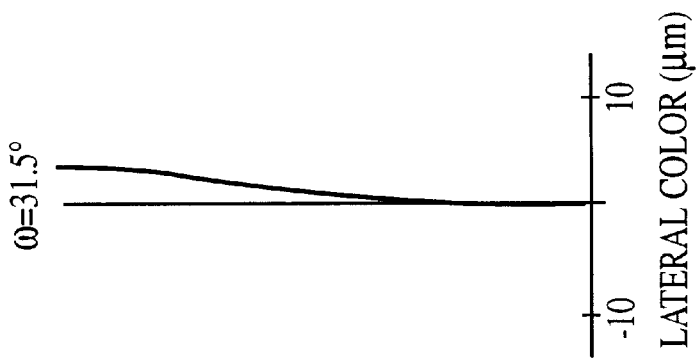
FIGS. 6(a)–6(d) show the spherical aberration, astigmatism, distortion, and lateral color respectively, at the wide-angle end of the lens of Embodiment 2.
Figure 6C:
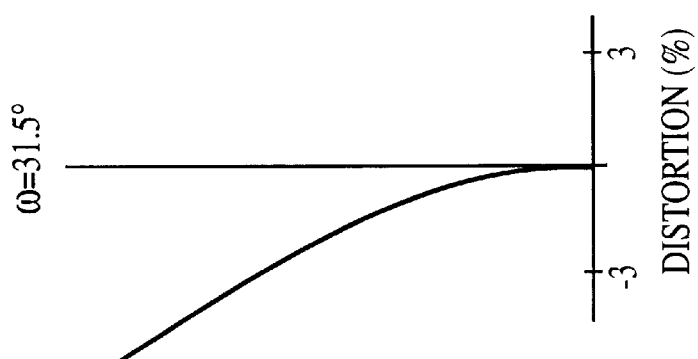
Figure 6B:
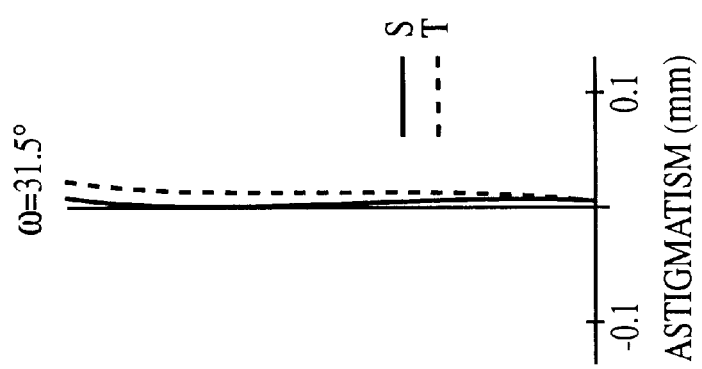
Figure 6A:
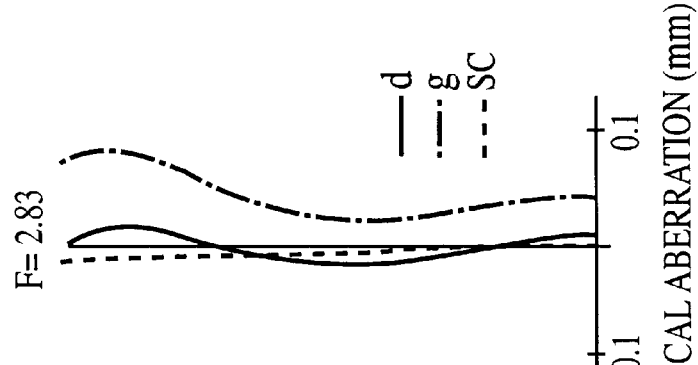
Figure 9A:
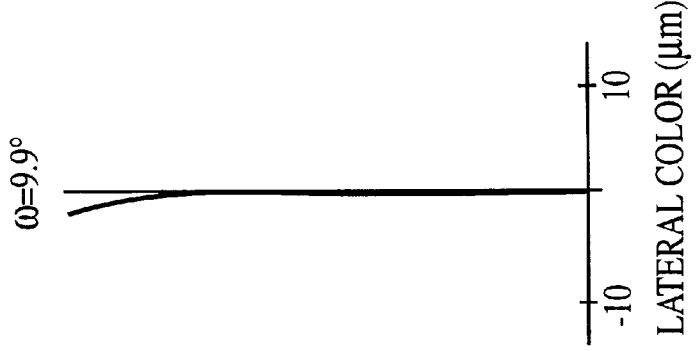
FIGS. 9(a)–9(d) show the spherical aberration, astigmatism, distortion, and lateral color at the telephoto end of the lens of Embodiment 3.
Figure 9B:
Figure 9C:
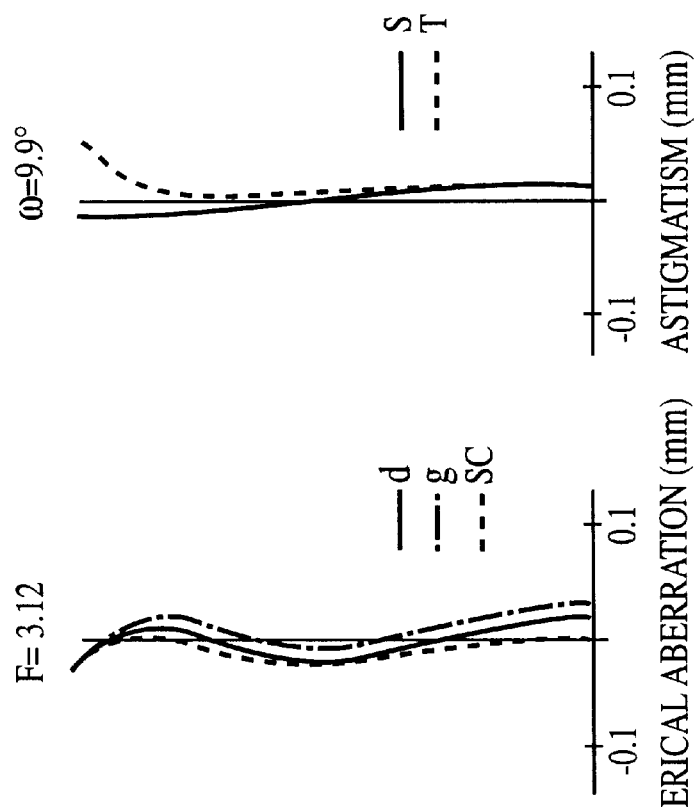
Figure 9D:
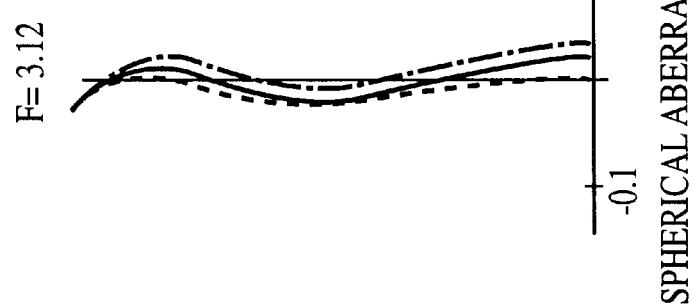

FIG. 2 shows the basic lens element construction and lens group positions at the wide-angle end, respectively, and the telephoto end according to Embodiment 2 of the present invention. Embodiment 2 has the same lens element configuration as in Embodiment 1 except that, in this embodiment, the ninth lens element $L_9$ of the fourth lens group is biconcave.

Table 3 shows the surface number # in order from the object side, the radius of curvature R (in mm) of each lens element surface, the spacing D (in mm) between each lens element surface, as well as the refractive index $N_d$ and the Abbe constant $V_d$ (at the sodium d-line) of each lens element of Embodiment 2.

In the middle portion of Table 3 are listed the values of $D_5$, $D_{10}$, $D_{15}$, $D_{20}$ at the wide-angle end and telephoto end. Furthermore, in the bottom portion of Table 3 are listed the focal length f and the $F_{NO.}$ of the zoom lens of this embodiment.

TABLE 3

| # | R | D | $N_d$ | $V_d$ |
|---|---|---|---|---|
| 1 | 81.546 | 1.50 | 1.84665 | 23.8 |
| 2 | 25.523 | 5.34 | 1.51741 | 52.4 |
| 3 | −184.673 | 0.10 | | |
| 4 | 23.333 | 3.66 | 1.83400 | 37.1 |
| 5 | 79.795 | $D_5$ | | |
| 6 | 92.514 | 1.00 | 1.83400 | 37.1 |
| 7 | 8.779 | 3.74 | | |
| 8 | −24.826 | 1.10 | 1.51741 | 52.4 |
| 9 | 10.191 | 3.23 | 1.84665 | 23.8 |
| 10 | 40.382 | $D_{10}$ | | |
| 11 | diaphragm | 1.50 | | |
| 12 | aspherical | 2.02 | 1.80610 | 40.7 |
| 13 | −74.075 | 1.20 | | |
| 14 | −112.977 | 2.00 | 1.83480 | 42.7 |
| 15 | 22.474 | $D_{15}$ | | |
| 16 | −38.148 | 0.70 | 1.84665 | 23.8 |
| 17 | 20.902 | 2.91 | 1.62041 | 60.3 |
| 18 | −17.498 | 0.15 | | |
| 19 | aspherical | 2.26 | 1.59380 | 61.4 |
| 20 | −35.390 | $D_{20}$ | | |
| 21 | ∞ | 13.90 | 1.51680 | 64.2 |
| 22 | ∞ | | | |

| | WIDE | TELE |
|---|---|---|
| $D_5$ | 1.00 | 13.36 |
| $D_{10}$ | 14.59 | 2.23 |
| $D_{15}$ | 6.73 | 3.08 |
| $D_{20}$ | 0.00 | 3.64 |
| | f = 10.05 − 30.16 | $F_{NO.}$ = 2.83 − 3.08 |

Table 4 below lists the values of C, K, and $A_4$–$A_{10}$ in Equation A which define the shape of the aspherical surfaces indicated in Table 3. In the bottom section of Table 4, are listed the values of Conditions (1)–(3), respectively.

TABLE 4

| # | C | K | $A_4$ | $A_6$ | $A_8$ | $A_{10}$ |
|---|---|---|---|---|---|---|
| 12 | 0.0684 | 3.7397788 | $-0.1504677 \times 10^{-3}$ | $-0.2684560 \times 10^{-5}$ | $0.2754309 \times 10^{-7}$ | $-0.1869300 \times 10^{-9}$ |
| 19 | 0.0492 | 0.1968081 | $-0.2140039 \times 10^{-4}$ | $0.2638057 \times 10^{-6}$ | $-0.1364317 \times 10^{-7}$ | $0.1950386 \times 10^{-9}$ |

Condition (1) value: $|f_2|/(f_w \times f_t)^{0.5} = 0.58$
Condition (2) value: $f_3/(f_w \times f_t)^{0.5} = 1.94$
Condition (3) value: $f_4/(f_w \times f_t)^{0.5} = 1.09$ Embodiment 3

FIG. 3 shows the basic lens element construction and lens group positions at the wide-angle end and the telephoto end according to Embodiment 3 of the present invention. Embodiment 3 has the same lens element configuration as Embodiment 1 except that, in this embodiment, the ninth lens element $L_9$ of the fourth lens group is biconcave.

Table 5 shows the surface number # in order from the object side, the radius of curvature R (in mm) of each lens element surface, the spacing D (in mm) between each lens element surface, as well as the refractive index $N_d$ and the Abbe constant $V_d$ (at the sodium d-line) of each lens element of Embodiment 3.

In the middle portion of Table 5 are listed the values of $D_5$, $D_{10}$, $D_{15}$, $D_{20}$ at the wide-angle end and telephoto end. Furthermore, in the bottom portion of Table 5 are listed the focal length f and the $F_{NO.}$ of the zoom lens of this embodiment.

TABLE 5

| # | R | D | $N_d$ | $V_d$ |
|---|---|---|---|---|
| 1 | 152.259 | 1.50 | 1.83400 | 37.1 |
| 2 | 27.452 | 6.54 | 1.51680 | 64.2 |
| 3 | -103.920 | 0.73 | | |
| 4 | 24.812 | 3.63 | 1.71299 | 53.8 |
| 5 | 104.425 | $D_5$ | | |
| 6 | 167.565 | 1.00 | 1.83400 | 37.1 |
| 7 | 11.103 | 2.89 | | |
| 8 | -27.301 | 2.00 | 1.51823 | 58.9 |
| 9 | 12.827 | 2.75 | 1.84665 | 23.8 |
| 10 | 57.252 | $D_{10}$ | | |
| 11 | diaphragm | 1.50 | | |
| 12 | aspherical | 2.00 | 1.80610 | 40.7 |
| 13 | -78.097 | 1.20 | | |
| 14 | -26.432 | 2.30 | 1.59551 | 39.2 |
| 15 | 72.996 | $D_{15}$ | | |
| 16 | -38.436 | 0.70 | 1.84665 | 23.8 |
| 17 | 27.541 | 2.65 | 1.71299 | 23.8 |
| 18 | -23.174 | 0.15 | | |
| 19 | aspherical | 2.02 | 1.59380 | 61.4 |
| 20 | -36.652 | $D_{20}$ | | |
| 21 | ∞ | 13.90 | 1.51680 | 64.2 |
| 22 | ∞ | | | |

| | WIDE | TELE |
|---|---|---|
| $D_5$ | 1.00 | 16.46 |
| $D_{10}$ | 17.83 | 2.37 |

TABLE 5-continued

| $D_{15}$ | 7.75 | 3.36 |
|---|---|---|
| $D_{20}$ | 0.00 | 4.39 |
| | f = 11.02 – 33.07 | $F_{NO.}$ = 2.82 – 3.12 |

Table 6 below lists the values of C, K, and $A_4$–$A_{10}$ in Equation A which define the shape of the aspherical surfaces indicated in Table 5. In the bottom section of Table 6, are listed the values of Conditions (1)–(3), respectively.

TABLE 6

| # | C | K | $A_4$ | $A_6$ | $A_8$ | $A_{10}$ |
|---|---|---|---|---|---|---|
| 12 | 0.0530 | 3.8486355 | $-0.5617542 \times 10^{-4}$ | $-0.1255617 \times 10^{-5}$ | $0.2810235 \times 10^{-7}$ | $-0.2853359 \times 10^{-9}$ |
| 19 | 0.0364 | 0.0762037 | $-0.3227885 \times 10^{-4}$ | $0.2371482 \times 10^{-6}$ | $-0.1285650 \times 10^{-7}$ | $0.1880998 \times 10^{-9}$ |

Condition (1) value: $|f_2|/(f_w \times f_t)^{0.5} = 0.66$
Condition (2) value: $f_3/(f_w \times f_t)^{0.5} = 2.03$
Condition (3) value: $f_4/(f_w \times f_t)^{0.5} = 1.18$ FIGS. 4, 6 and 8 show the spherical aberration, astigmatism, distortion and lateral color at the wide-angle end of the zoom lens for Embodiments 1–3, respectively. FIGS. 5, 7, and 9 show the spherical aberration, astigmatism, distortion and lateral color at the telephoto end of the zoom lens for Embodiments 1–3, respectively. Moreover, each spherical aberration curve illustrates the sine condition SC in addition to the spherical aberration for both the d-line and g-line. Further, the $F_{NO}$ is listed. Each astigmatism curve lists the half-image angle ω and illustrates the astigmatism in both the sagittal S and tangential T planes. As is clearly seen from these Figures, the various aberrations can be favorably corrected for each embodiment of the invention.

Table 7 gives, for each of Embodiments (1)–(3), the actual image magnification ratio when the zoom ratio is set at 3.00 and when the object distance is 2 m and 0.6 m, respectively.

TABLE 7

| | | Ratio of Actual Image Magnification for Object Distance of | |
|---|---|---|---|
| | Zoom Ratio Set at | 2 mm | 0.6 m |
| Embodiment 1 | 3.00 | 2.99 | 2.98 |
| Embodiment 2 | 3.00 | 2.99 | 3.00 |
| Embodiment 3 | 3.00 | 2.99 | 3.00 |

According to Table 7, when the object distance is changed from 2 m to 0.6 m, there is almost no decrease in actual image magnification for a set zoom ratio of 3.00. Thus, the prior art problem of the zoom ratio decreasing at very near object distances can be restrained.

The zoom lens described in the above-mentioned Japanese Laid-open Patent Application H7-199071 has four lens groups; with the first and third lens groups being fixed in position, the second lens group moves for zooming, and the fourth lens groups moves for maintaining the image plane at a fixed position despite changes in zoom factor and object distance. Thus, the configuration of the zoom lens appears to be similar to that of the present invention. However, as shown in the following Table 8, the lens in each embodiment of Japanese Laid-open Patent Application H7-199071 does not satisfy each of Conditions (1), (2) and (3) of the present invention. (A value not satisfying the condition is indicated in brackets.)

TABLE 8

(PRIOR ART)

| H7-199071 Embodiments | value of $f_2/(f_w \times f_t)^{0.5}$ | value of $f_3/(f_w \times f_t)^{0.5}$ | value of $f_4/(f_w \times f_t)^{0.5}$ |
|---|---|---|---|
| 1 | [−0.90] | 1.91 | [1.60] |
| 2 | −0.57 | [1.23] | 1.05 |
| 3 | −0.63 | [1.44] | 1.14 |
| 4 | −0.57 | [1.64] | 1.11 |
| 5 | [−0.49] | [1.07] | [1.20] |
| 6 | [−0.43] | [1.35] | [1.24] |
| 7 | [−0.41] | [1.43] | [0.99] |
| 8 | −0.67 | [1.48] | [1.27] |
| 9 | −0.68 | [1.60] | [1.27] |

As explained above, the zoom lens of the present invention provides a compact lens configuration having four, and only four, lens groups. By satisfying predetermined conditions, magnification at a particular zoom setting is prevented from declining even when the viewed object is nearby. This is accomplished without increasing the range of distance over which the fourth lens group is moved. Thus, the present invention provides a high picture quality with favorable aberration correction over an entire zoom range for all object distances. And, at the same time, the zoom lens of the present invention is compact, thereby enabling the camera itself to be compact.

The invention being thus described, it will be obvious that the same may be varied in many ways. For example, the lens element shapes and the number of aspherical surfaces employed, as well as the shapes of these aspherical surfaces, can be appropriately chosen. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens consisting of four lens groups, said four lens groups being, in order from the most object side of said zoom lens, as follows:

a first lens group with positive refractive power;

a second lens group with negative refractive power;

a third lens group with positive refractive power; and a fourth lens group with positive refractive power, wherein the focal length of the zoom lens is changed by shifting said second lens group in the optical axis direction while said first lens group and third lens group remain stationary, focus variations resulting from changes in object distance are achieved by shifting said fourth lens group in the optical axis direction;

at least one lens element of said lens groups has an aspherical surface; and the following conditions are satisfied:

$0.55<|f_2|/(f_w \times f_t)^{0.5}<0.70$, Condition (1)

$1.65<f_3/(f_w \times f_t)^{0.5}<2.10$, and Condition (2)

$1.00<f_4/(f_w \times f_t)^{0.5}<1.20$ Condition (3)

where $f_2$ is the focal length of the second lens group, $f_3$ is the focal length of the third lens group, $f_4$ is the focal length of the fourth lens group, $f_w$ is the focal length of the zoom lens at the wide-angle end, and $f_t$ is the focal length of the zoom lens at the telephoto end.

2. The zoom lens of claim 1, wherein the third lens group comprises two lens elements, one of positive refractive power and one of negative refractive power, and at least one surface of the lens element with positive refractive power is aspherical.

3. The zoom lens of claim 1, wherein the fourth lens group comprises, in order from the most object side of the fourth lens group:

a lens formed of a lens element of negative refractive power and a lens element with positive refractive power that are cemented together; and, a lens element with positive refractive power;

wherein at least one surface of the last-recited lens element with positive refractive power is aspherical.

4. The zoom lens of claim 2, wherein the fourth lens group comprises, in order from the most object side of the fourth lens group:

a lens formed of a lens element of negative refractive power and a lens element with positive refractive power that are cemented together; and, a lens element with positive refractive power;

wherein at least one surface of the last-recited lens element with positive refractive power is aspherical.

\* \* \* \* \*

UNITED STATES PATENT AND TRADEMARK OFFICE
CERTIFICATE OF CORRECTION

PATENT NO : 6,124,983
DATED : September 26, 2000
INVENTOR(S): Yahagi et al.

It is certified that error appears in the above-identified patent and that said Letters Patent are hereby corrected as shown below:

On the front page, under "Foreign Application Priority Data", change the number of the Japanese Priority Document from "10-5810230" to -- 10-250230 --;

In Table 5, change the value of $V_d$ for surface #17 from "23.8" to -- 53.8 --.

Signed and Sealed this

Eighth Day of May, 2001

Attest:

NICHOLAS P. GODICI

Attesting Officer

Acting Director of the United States Patent and Trademark Office